US008493890B2

(12) United States Patent
Wu et al.

(10) Patent No.: US 8,493,890 B2
(45) Date of Patent: Jul. 23, 2013

(54) DETERMINING NODE LOCATION IN A WIRELESS NETWORK

(75) Inventors: Wei Wu, Palo Alto, CA (US); Marco Florentino, Mountain View, CA (US); R. Stanley Williams, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 12/759,350

(22) Filed: Apr. 13, 2010

(65) Prior Publication Data
US 2011/0249594 A1   Oct. 13, 2011

(51) Int. Cl.
*H04L 12/28* (2006.01)

(52) U.S. Cl.
USPC ........ 370/255; 370/277; 370/310; 455/414.2; 455/456.1; 455/457

(58) Field of Classification Search
USPC ....... 370/254–255, 277–278, 310; 455/404.2, 455/414.2, 456.1–457
See application file for complete search history.

(56) References Cited

U.S. PATENT DOCUMENTS

| 3,633,204 | A | * | 1/1972 | Earp et al. | 342/458 |
| 4,861,758 | A | | 8/1989 | Breen | |
| 5,781,297 | A | | 7/1998 | Castore | |
| 6,151,310 | A | * | 11/2000 | Dent | 370/330 |
| 7,693,654 | B1 | * | 4/2010 | Dietsch et al. | 701/461 |
| 8,060,115 | B2 | * | 11/2011 | Hwang et al. | 455/456.2 |
| 2006/0166681 | A1 | * | 7/2006 | Lohbihler | 455/456.2 |
| 2007/0111737 | A1 | * | 5/2007 | Swope et al. | 455/456.2 |
| 2010/0046494 | A1 | * | 2/2010 | Palanki et al. | 370/344 |
| 2010/0130165 | A1 | * | 5/2010 | Snyder et al. | 455/410 |
| 2010/0317371 | A1 | * | 12/2010 | Westerinen et al. | 455/456.6 |
| 2011/0148712 | A1 | * | 6/2011 | DeCabooter et al. | 342/457 |
| 2012/0094639 | A1 | * | 4/2012 | Carlson et al. | 455/414.1 |

* cited by examiner

*Primary Examiner* — Ayaz Sheikh
*Assistant Examiner* — Mounir Moutaouakil

(57) ABSTRACT

Transmitting nodes broadcast chirped signals on a wireless network. The transmitting nodes are time-synchronized with each other and location of the transmitting nodes is known. A receiver node detects beat frequencies created by pairs of chirped signals from different pairs of transmitting nodes. Time delay differences between chirped signals in respective beat frequency pairs are determined. The receiver node's location is determined in view of the time delay differences.

14 Claims, 4 Drawing Sheets

DETERMINING NODE LOCATION IN A WIRELESS NETWORK

BACKGROUND

In many applications that involve a network of nodes (e.g., sensor node networks), node location information is very useful. While GPS (Global Positioning System) satellites can generate location information for various nodes with GPS receivers, it is not practical or even feasible for all nodes to have GPS functionality.

BRIEF DESCRIPTION OF DRAWINGS

The following description includes discussion of figures having illustrations given by way of example of implementations of embodiments of the invention.

DETAILED DESCRIPTION

The GPS (Global Positioning System) satellite system facilitates determination of geographic location of various GPS-equipped devices. GPS uses information including timing of GPS-message transmissions and precise knowledge of orbital information and general system health to compute location information for a GPS-enabled device, typically using four or more satellites to triangulate location/position. While GPS works well, the relative expense of including GPS functionality on a per-device basis renders GPS impractical for use in large scale systems such as sensor networks.

Sensor networks may include hundreds or thousands of sensor nodes in a geographic area, each responsible for collecting external sensory data (e.g., temperature, seismic activity, etc.). Associating collected sensory data with a precise geographic location enhances the value of the data for researchers, engineers and the like. In lieu of enabling each sensor in a sensor network with GPS functionality (e.g., a GPS chip), embodiments described herein leverage the known locations of certain nodes (e.g., base stations) in a wireless network to determination the location of other nodes. Nodes with known locations may include GPS functionality, but it is not necessary that they include such.

Figure 1:
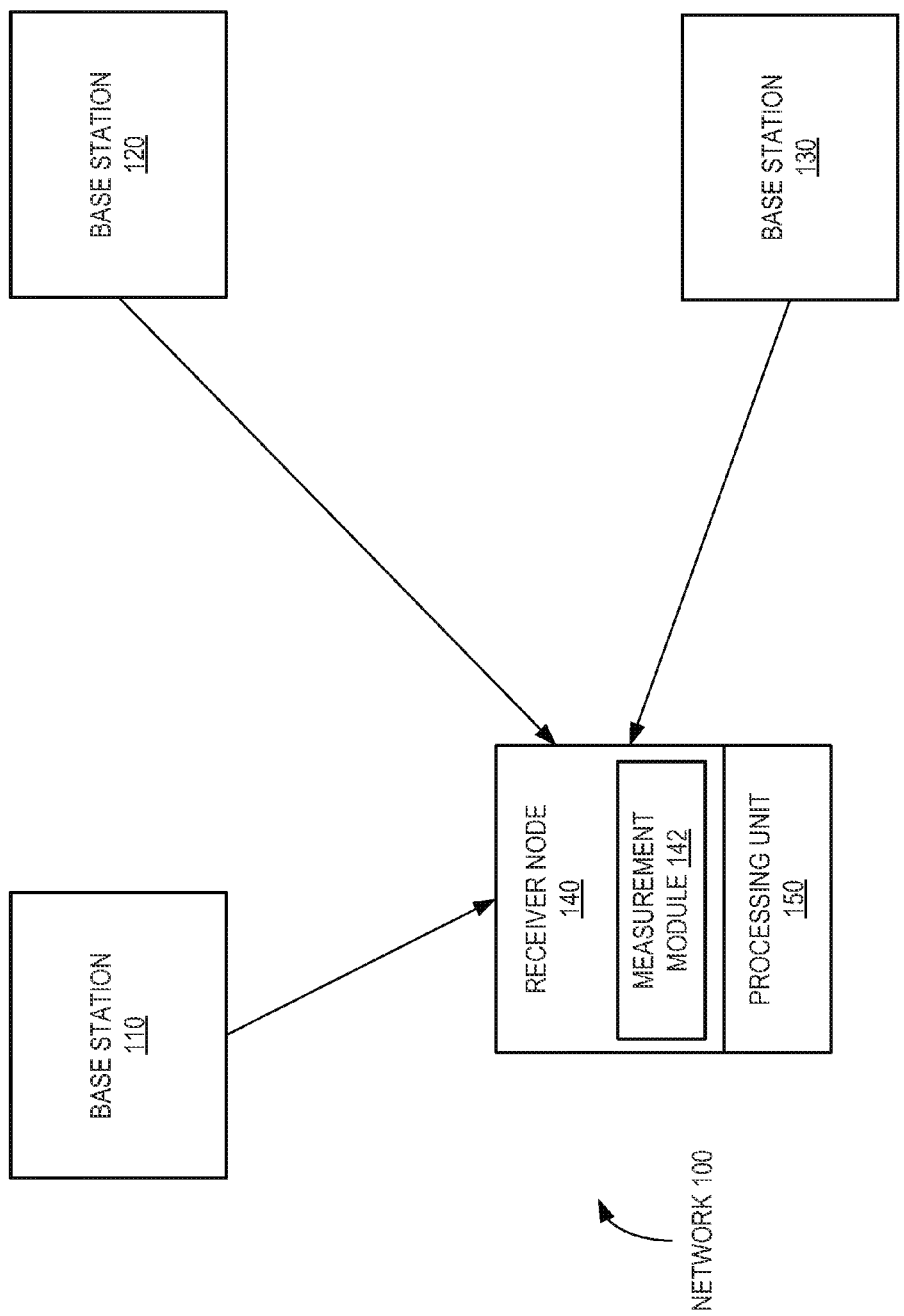
FIG. 1 is a block diagram illustrating a system according to various embodiments.

FIG. 1 is a block diagram illustrating a system according to various embodiments. Network 100 includes wireless base stations 110, 120 and 130. Other embodiments could employ a different number of base stations without departing from the scoped of the teachings described herein. As used herein, a base station refers to any wireless node capable of transmitting (e.g., via broadcast) chirped signals at designated time intervals. In various embodiments, base stations (also referred to as transmitting nodes) have fixed geographic locations. However, in some embodiments, one or more base stations could be mobile so long as the locations of such base stations are known at the time of transmitting chirped signals. In either case, the locations of base stations 110-130 are known (e.g., via GPS, etc.).

As mentioned above, base stations 110-130 broadcast chirped signals. Signals may be chirped according to a linear chirp or a non-linear chirp. Radio frequency (RF), acoustic wave (sound) and/or other suitable frequency ranges may be used to broadcast chirped signals. In various embodiments, chirped signals are synchronized (e.g., in time and/or frequency) between base stations. In addition to sending chirped signals, base stations 110-130 may broadcast other side information including, but not limited to, timing information (e.g., timestamps), location information (e.g., geo-tags, etc.), base station identifier, etc. associated with the chirped signal(s).

Receiver node 140 receives chirped signals from multiple base stations and includes at least a measurement module 142. In various embodiments, the chirped signals from different base stations create one or more beat frequencies at receiver node 140. Measurement module 142 measures the beat frequency created by chirped signals from a pair of base stations. Multiple different pairs of base stations can cause multiple different beat frequencies. Receiver node 140 may use side information (e.g., base station ID) to determine respective origins of the chirped signals creating the one or more beat frequencies.

A processing unit 150, located on receiver node 140 in various embodiments, determines the location of receiver node 140 based on beat frequency measurements for different base station pairs. In alternate embodiments, processing unit 150 could be in a separate and/or different location from receiver node 140. In such embodiments, receiver node 140 could simply send information (e.g., from measurement module 142) to processing unit 150 for processing.

In particular, processing unit 150 determines the differential distance of the two nodes with respect to receiver node 140 based on the beat frequency. Beat frequencies are perceived as periodic variations in signal amplitude whose rate is the difference between two frequencies. Thus, given the synchronization (e.g., in time, frequency, etc.) of chirped signals among base stations 110-130, the frequency difference between two chirped signals (e.g., from base stations 110 and 120, respectively) at receiver node 140 is directly related to the differing distances of the base stations to receiver node 140.

Given that beat frequencies represent the difference in frequency between two different signals, beat frequencies are likely to be lower than the originally transmitted frequencies. Thus, receiver node 140 can measure beat frequencies with a high level of accuracy while saving power and processing resources.

In various embodiments, base station pairs may be assigned specific timeslots for broadcasting chirped signals. Using base stations 110-130 as an example, base station pair 110 and 120 could broadcast at a first timeslot, base station pair 110 and 130 could broadcast at a second timeslot, and base station pair 120 and 130 could broadcast at a third timeslot. Each base station pair creates a beat frequency at the location of receiver node 140. For each measured beat frequency, processing unit 150 determines the differential distance of the pair of base stations with respect to receiver node 140 in view of the known locations of the pair of base stations. Given sufficient beat frequencies and differential distances, processing unit 150 triangulates the location of receiver node 140. Once the location of receiver node 140 is known, the location information can be used for a variety of purposes (e.g., geo-tagging sensory data collected by the node, etc.).

Figure 2:
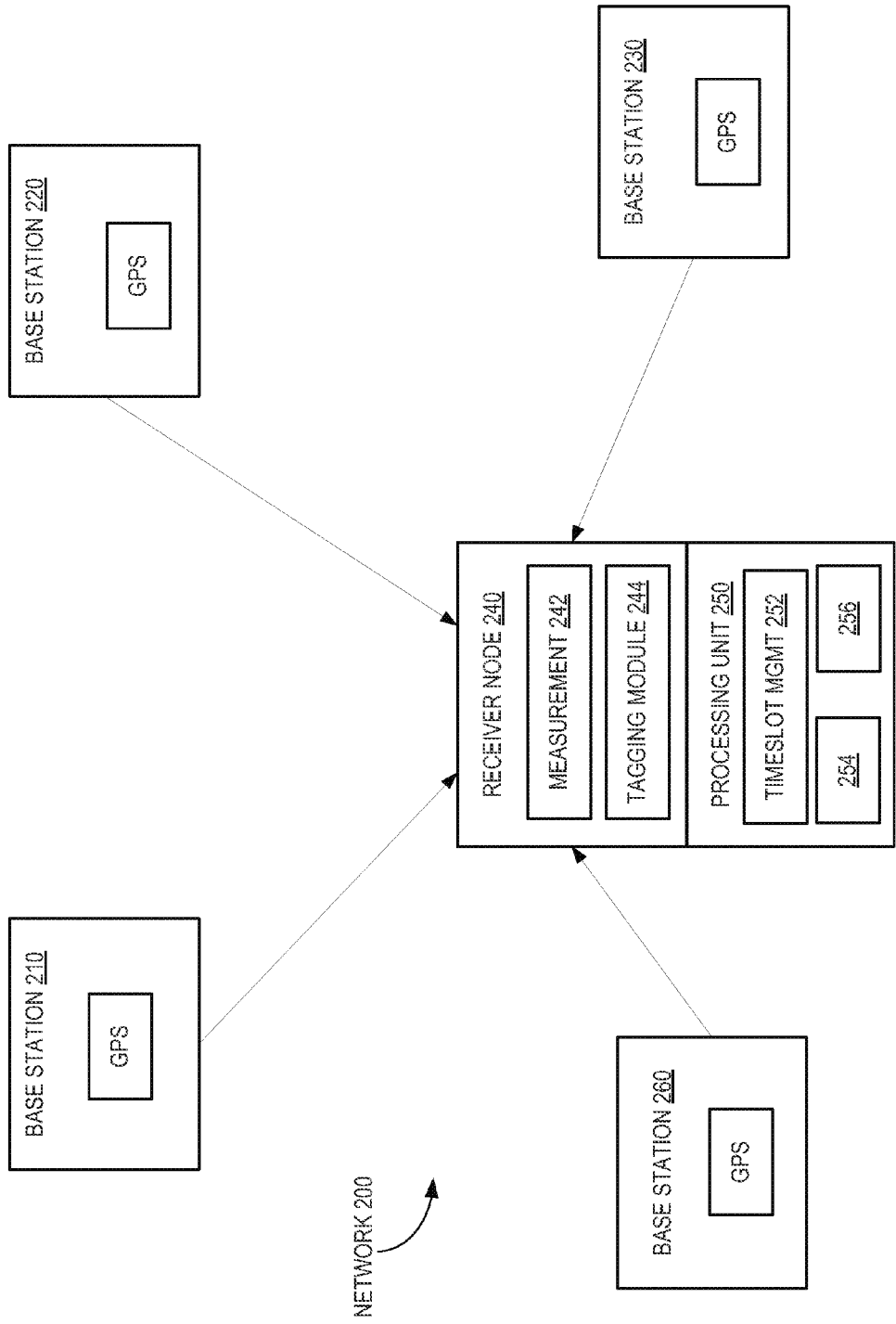
FIG. 2 is a block diagram illustrating a system according to various embodiments.

FIG. 2 is a block diagram illustrating a system according to various embodiments. Network 200 includes wireless base stations 210, 220, 230 and 260. Other embodiments could employ a different number of base stations without departing from the scoped of the teachings described herein. In various embodiments, base stations (also referred to as transmitting nodes) have fixed geographic locations. However, in some embodiments, one or more base stations could be mobile so long as the locations of such base stations are known at the time of transmitting chirped signals. In either case, for purposes of various embodiments, the locations of base stations 210, 220, 230 and 260 are known. As shown, each base station is equipped with GPS functionality. For example, each base station may have a GPS receiver or type of GPS chip to synchronize a clock on the base station with a GPS clock. Given that each base station in network 200 similarly synchronizes to a GPS clock, all base station clocks in network 200 are, therefore, synchronized to each other.

The base stations in network 200 broadcast chirped signals. Chirped signals may be linear chirps or non-linear chirps. In various embodiments, the base stations in network 200 and, more particularly the chirped signals broadcast from the base stations, are synchronized (e.g., in time and/or frequency) between base stations. When two different base stations broadcast chirped signals at the same time using the same chirp frequency, the differing distances of the base stations to receiver node 240 result in differing frequencies of the chirped signals upon arrival at receiver node 240.

In addition to sending chirped signals, the base stations in network 200 may broadcast other side information associated with the chirped signals including, but not limited to, timing information (e.g., timestamps), location information (e.g., geo-tags, etc.), base station identifier, etc.

Receiver node 240 receives chirped signals from multiple base stations. As discussed above, the chirped signals from different base stations create one or more beat frequencies at receiver node 240. In particular, each base station pair (where a pair is defined as two base stations broadcasting at a common timeslot) creates a beat frequency at receiver node 240. Measurement module 242 measures the beat frequency created by chirped signals from base station pairs. Given multiple different pairs of base stations broadcasting chirped signals (on respective timeslots), multiple different beat frequencies may be detected at receiver node 240. In various embodiments, receiver node 240 uses received side information (e.g., base station IDs, etc.) to determine respective origins of the chirped signals that create the one or more beat frequencies.

Processing unit 250, integrated onto receiver node 240 in various embodiments, determines the location (e.g., in (x,y) coordinates) of receiver node 240 based on beat frequency measurements for different base station pairs. In particular, processing unit 250 determines the differential distance of a pair of nodes with respect to receiver node 240 based on the beat frequency created by the pair of nodes. As discussed previously, a beat frequency is perceived as periodic variations in signal amplitude whose rate is the difference between two frequencies, each frequency chirped from a different base station. Thus, given the synchronization (e.g., in time, frequency, etc.) of chirped signals among base stations in network 200, the frequency difference between two chirped signals (e.g., from base stations 210 and 260, respectively) at receiver node 240 is directly related to the differing distances of the base stations to receiver node 240.

Processing unit 250 could alternatively be implemented as a stand alone unit or it could be integrated with one or more base stations in network 200. In various embodiments, timeslot management module 252 coordinates specific timeslots for broadcasting chirped signals. Processing unit 250 may include or be connected to a transmitter/receiver to communicate with base stations allowing timeslot management module 252 to coordinate timeslots. Using base stations in network 200 as an example, base station pair 210 and 220 could broadcast on a first timeslot, base station pair 210 and 230 could broadcast at a second timeslot, base station pair 220 and 230 could broadcast at a third timeslot, etc.

Each base station pair creates a beat frequency at the location of receiver node 240 (excluding the possible exception of a base station pair being equidistant from receiver node 240, which would cause both chirped signals to have the same frequency at receiver node 240, yielding a beat frequency of zero). For each measured beat frequency, processing unit 250 determines the differential distance of the pair of base stations with respect to receiver node 240 in view of the known locations of the pair of base station. Given sufficient beat frequencies and differential distances, processing unit 250 triangulates the location of receiver node 240. It should be noted that processing unit 250 may have additional information to aid in location determination. For example, processing unit 250 may have some approximate information and/or estimate(s) about the location of receiver node 240 upon which processing unit 250 can iterate to reduce location determination processing.

Once the location of receiver node 240 is known, tagging module 240 tags external sensory information (e.g., temperature data, seismic activity data, etc.) with the location information determined by processing unit 250. Sensory data tagged with location information can be aggregated with other tagged sensory data from other nodes in network 200 to generate useful data related to the entire geographic area covered by network 200. For example, sensory data tagged with location information can be used to generate a map of sensory data for the area covered by network 200 or a portion thereof.

The various receiver node modules (measurement, timeslot management, etc.) of FIG. 1 and FIG. 2 may be implemented as one or more software modules, hardware modules, special-purpose hardware (e.g., application specific hardware, application specific integrated circuits (ASICs), embedded controllers, hardwired circuitry, etc.), or some combination of these. Additionally, the various functions and operations of described embodiments may be implemented as instructions executable by a processor (e.g., processor 254) and stored on a computer-readable storage medium (e.g., memory 256).

Figure 3:
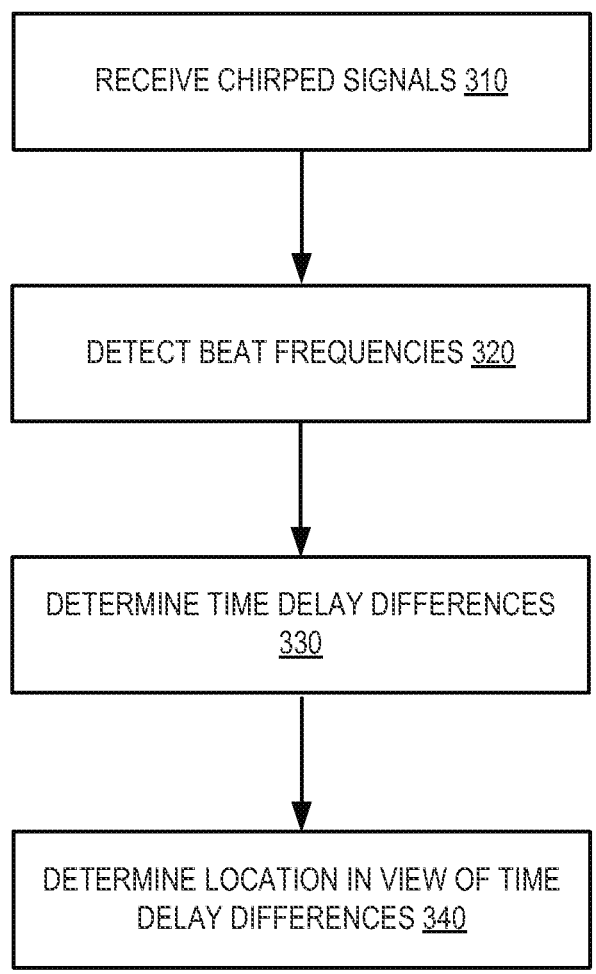
FIG. 3 is a flow diagram of operation in a system according to various embodiments.

FIG. 3 is a flow diagram of operation in a system according to various embodiments. FIG. 3 illustrates particular operations and execution order according to certain embodiments. However, in different embodiments, other operations, omitting one or more of the depicted operations, and/or proceeding in other orders of execution may also be employed according to teachings described herein.

A node in a wireless network receives 310 chirped signals broadcast from transmitting nodes in the wireless network. In various embodiments, transmitting nodes are wireless base stations that are time-synchronized with each other (e.g., via GPS). The locations (e.g., in (x,y) coordinates, etc.) of the transmitting nodes are known and, in various embodiments, are communicated to the receiving node along with the chirped signal(s).

The node detects 320 beat frequencies created by pairs of chirped signals from different pairs of transmitting nodes. For example, if a receiving node received chirped signals from four different transmitting nodes (e.g., nodes A, B, C, and D), then it could detect up to six beat frequencies for the six possible pairs of transmitting nodes (e.g., AB, AC, AD, BC, BD, and CD). The receiving node may, in certain embodiments, detect fewer beat frequencies than the maximum possible based on the number of transmitting nodes from which the receiving node receives chirped signals.

Given the detected beat frequencies, the receiving node determines 330 the time delay differences between chirped signals in each respective beat frequency pair. In other words, for each detected beat frequency, there are chirped signals from two different transmitting nodes. Because the frequency of a chirped signal changes over time, different signal frequencies at the receiving node indicate different time delays of the chirped signals reaching the receiving node.

Based on the determined time delay differences (and the known locations of the transmitting nodes), the receiving node determines 340 its location. In various embodiments, dividing the beat frequency by the rate of change of the chirped signals results in the time delay difference for the two chirped signals originating from the transmitting nodes in the beat frequency pair. Using time delay differences from several beat frequency pairs of transmitting nodes (along with the known locations of the transmitting nodes), the receiving node (or some other processing unit in communication with the receiver node) can triangulate its position.

Figure 4:
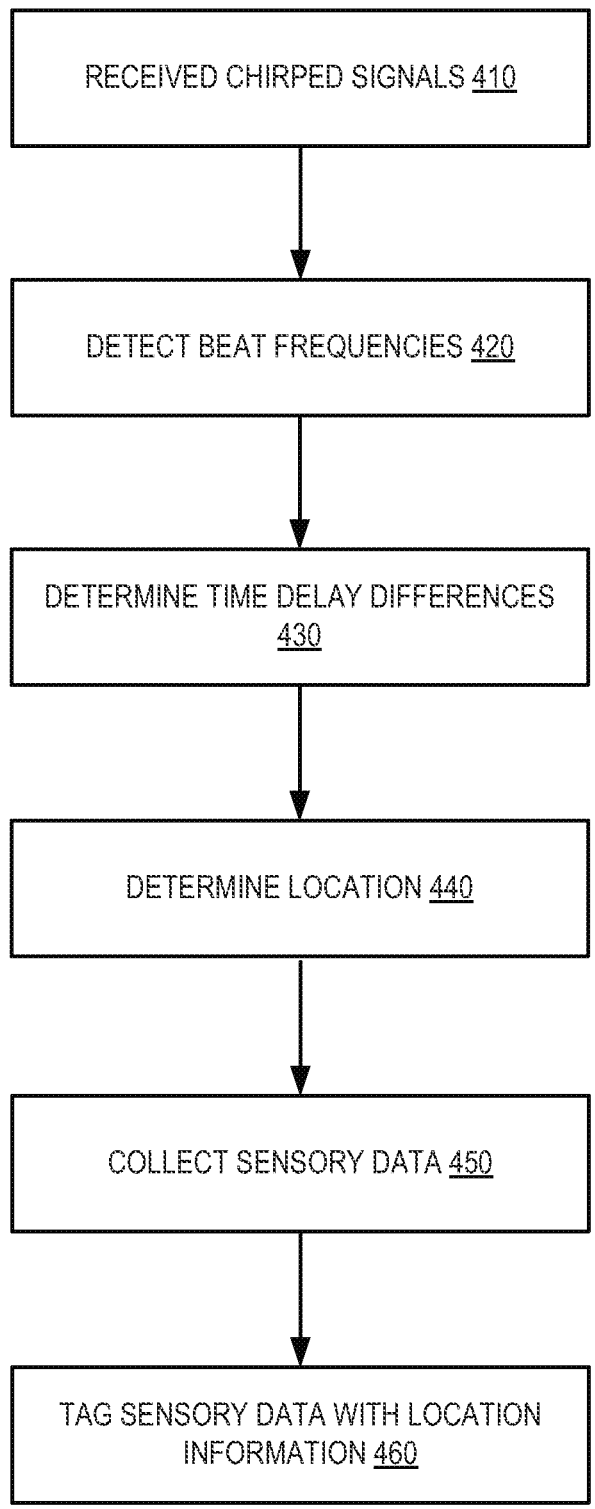
FIG. 4 is a flow diagram of operation in a system according to various embodiments.

FIG. 4 is a flow diagram of operation in a system according to various embodiments. FIG. 4 illustrates particular operations and execution order according to certain embodiments. However, in different embodiments, other operations, omitting one or more of the depicted operations, and/or proceeding in other orders of execution may also be employed according to teachings described herein.

A node in a wireless network receives 410 chirped signals broadcast from transmitting nodes in the wireless network. In various embodiments, transmitting nodes are wireless base stations that are time-synchronized with each other (e.g., via GPS). The locations (e.g., in (x,y) coordinates, etc.) of the transmitting nodes are known and, in various embodiments, are communicated to the receiving node along with the chirped signal(s). In certain embodiments, the receiving node is a sensor node that collects external sensory data (e.g., temperature, wind, seismic activity, etc.).

As described previously, pairs of transmitting nodes may share a common timeslot for transmitting (e.g., broadcasting) chirped signals. Given the change in frequency over time of a chirped signal, differing distances from transmitting node to receiving node result in chirped signals transmitted on the common timeslot having different frequencies upon arrival at the receiving node. Accordingly, the node detects 420 beat frequencies created by pairs of chirped signals from different pairs of transmitting nodes.

In view of any detected beat frequencies, the receiving node determines 430 the time delay differences between chirped signals in each respective beat frequency pair. Based on the determined time delay differences (and the known locations of the transmitting nodes), the receiving node determines 440 its location. As described above, dividing the measured beat frequency by the rate of change of the chirped signals is one example of how to determine a time delay difference for the two chirped signals originating from the transmitting nodes in the beat frequency pair. Using time delay differences from several beat frequency pairs of transmitting nodes (along with the known locations of the transmitting nodes), the receiving node (or some other processing unit in communication with the receiver node) can triangulate its own position.

In various embodiments, the node collects 450 sensory data (e.g., temperature, wind, seismic activity, etc.). Sensory data may be collected from natural sources and/or man-made sources. The node tags 460 the collected sensory data with location information determined as described above. Location tags could be added to sensory data, for example, as headers in a packet, metadata or other suitable tagging mechanisms. Other relevant information could be included in the same tags or in separate tags including, but not limited to, timestamps, correlation data, etc. In certain embodiments, tagged sensory data from the receiving node could be combined with tagged sensory data from other receiving nodes in a sensor network to generate useful information about all or part of the sensor network and/or the geographic area covered by the sensor network. For example, tagged sensory data could be combined to generate a map (e.g., a temperature map) of the geographic area covered by the sensor network.

The invention claimed is:

1. A method for determining node location in a wireless network, comprising:

receiving, at a receiver node, chirped signals, each chirped signal being broadcast from a transmitting node of a plurality of pairs of transmitting nodes in the wireless network, wherein the transmitting nodes of each pair share a common timeslot and transmit identical chirped signals, and wherein a location of the transmitting nodes is known;

detecting beat frequencies, wherein each beat frequency is created by a pair of the chirped signals broadcast from each of the pairs of transmitting nodes;

determining time delay differences between the chirped signals corresponding to each beat frequency, wherein each time delay difference is calculated by dividing the beat frequency of a pair of chirped signals by a frequency rate of change of the chirped signals;

determining differential distances of the pairs of transmitting nodes to the receiver node based on the time delay differences and the known location of the transmitting nodes; and determining a location of the receiver node in view of the differential.

2. The method of claim 1, wherein the transmitting nodes are base stations having known locations and wherein the base stations are time-synchronized via Global Position System (GPS).

3. The method of claim 1, wherein the chirped signals are linearly chirped.

4. The method of claim 1, further comprising:

collecting sensory data at the receiver node; and tagging the sensory data with the determined location information.

5. The method of claim 4, further comprising:

combining tagged sensory data from the receiver node with tagged sensory data from other receiver nodes in the network to generate a map of sensory data for the network.

6. The method of claim 1, wherein receiving chirped signals broadcasted from transmitting nodes comprises:

receiving a first chirped signal from one of the transmitting nodes in a timeslot; and receiving a second chirped signal from the other transmitting node in the timeslot of the first chirped signal, wherein a transmitted frequency of the received first chirp signal is identical to a transmitted frequency of the second received chirped signal, the differential distance between the transmitting nodes and the receiver node creating the detected beat frequency.

7. The method of claim 1, wherein determining the location comprises:

triangulating the location of the receiver node in view of the differential distances.

8. An apparatus, comprising:
a receiver node to receive chirped signals from a plurality of paired time-synchronized base stations having a known location, the chirped signals broadcast at assigned timeslots;
a measurement module to measure a beat frequency created by received chirped signals from each pair of base stations; and
a processing unit to:
determine time delay differences between the chirped signals corresponding to each beat frequency, wherein each time delay difference is calculated by dividing the beat frequency of a pair of chirped signals by a frequency rate of change of the chirped signals;
determine a differential distance of each pair of base stations to the receiver node based on the time delay difference and the known locations of the base stations; and
determine a location of the receiver node in view of the differential distances associated with the pairs of base stations,
wherein to receive the chirped signals, the receiver node is to:
receive, in a timeslot, a first chirped signal from one of the base stations of the pair; and
receive, in the timeslot of the first chirped signal, a second chirped signal from the other base station of the pair,
wherein the first and second chirped signals are identical.

9. The apparatus of claim 8, wherein each base station comprises:
a GPS chip to synchronize a base station clock with other base station clocks and to provide location information for the base station.

10. The system of claim 8, wherein the receiver node further comprises a sensor to collect external sensory information and wherein the system further comprises:
a tagging module to tag external sensory information with location information determined by the processing unit.

11. The system of claim 8, further comprising:
a timeslot management module to coordinate sharing of the timeslot by at least two base stations.

12. A non-transitory computer-readable storage medium containing instructions, that when executed, cause a computer to:
receive, at a receiver node, a pair of chirped signals broadcast from each of a plurality of paired time-synchronized base stations, the base stations within a same pair of base stations transmitting identical chirped signals;
detect beat frequencies, wherein each beat frequency is created by a pair of the chirped signals broadcast from each of the pairs of base stations;
determine time delay differences between the chirped signals corresponding to each beat frequency, wherein each time delay difference is calculated by dividing the beat frequency of a pair of chirped signals by a frequency rate of change of the chirped signals;
determine a differential distance of each pair of base stations to the receiver node based on the time delay difference and the known locations of the base stations; and
determine a location of the receiver node via triangulation in view of the determined differential distances associated with the pairs of base stations,
wherein to receive the chirped signals, the instructions are to cause the computer to:
receive, in a timeslot, a first chirped signal from one of the base stations of the pair; and
receive, in the timeslot of the first chirped signal, a second chirped signal from the other base station of the pair, and
wherein the first and second chirped signals are identical.

13. The non-transitory computer-readable storage medium of claim 12, comprising further instructions that cause the computer to:
collect sensory data at the receiver node; and
tag the sensory data with location information determined via the triangulation.

14. The non-transitory computer-readable storage medium of claim 13, comprising further instructions that cause the computer to:
combine tagged sensory data from the receiver node with tagged sensory data from other receiver nodes in the network; and
generate a map of sensory data for the network.

* * * * *

UNITED STATES PATENT AND TRADEMARK OFFICE
CERTIFICATE OF CORRECTION

PATENT NO. : 8,493,890 B2
APPLICATION NO. : 12/759350
DATED : July 23, 2013
INVENTOR(S) : Wei Wu et al.

It is certified that error appears in the above-identified patent and that said Letters Patent is hereby corrected as shown below:

In the claims

In column 7, line 35, in Claim 10, delete "system" and insert -- apparatus --, therefor.

In column 7, line 40, in Claim 11, delete "system" and insert -- apparatus --, therefor.

Signed and Sealed this
Twelfth Day of November, 2013

Teresa Stanek Rea
*Deputy Director of the United States Patent and Trademark Office*